United States Patent
Wolman et al.

[11] Patent Number: 5,562,256
[45] Date of Patent: Oct. 8, 1996

[54] GARLIC GRATER

[76] Inventors: Norman B. Wolman, 151 Montevista Street, Dollard-des-Ormeaux, Quebec, Canada, H9B 3A6; George Bigelow, Sr.; George Bigelow, Jr., both of Kut Shing Building 12-F, Flat B8 Kut Shing St., Chai Wan, Hong Kong; Pierre Tardif, 445 St-Jean, Longueuil, Quebec, Canada, J4H 2Y1

[21] Appl. No.: 497,053

[22] Filed: Jun. 30, 1995

[51] Int. Cl.$^6$ .................................................. B02C 19/20
[52] U.S. Cl. .................... 241/169.1; 241/167; 241/273.3
[58] Field of Search .............................. 241/169.1, 273.3, 241/166, 167, DIG. 27

[56] References Cited

U.S. PATENT DOCUMENTS

| | | | |
|---|---|---|---|
| D. 235,501 | 6/1975 | Mantelet | 241/169.1 X |
| 410,900 | 9/1889 | King | 241/167 X |
| 507,287 | 10/1893 | Scarles | 241/169.1 |
| 762,497 | 6/1904 | Snyder | 241/169.1 X |
| 855,423 | 5/1907 | Alger | 241/169.1 |
| 4,856,718 | 8/1989 | Gaber et al. | 241/93 |
| 5,148,995 | 9/1992 | Hurst | 241/30 |
| 5,364,037 | 11/1994 | Bigelow | 241/93 |
| 5,435,237 | 7/1995 | Huang | 99/492 |

FOREIGN PATENT DOCUMENTS

| | | | |
|---|---|---|---|
| 3903635 | 8/1990 | Germany | 241/169.1 |

*Primary Examiner*—John M. Husar
*Attorney, Agent, or Firm*—Burns, Doane, Swecker & Mathis, L.L.P.

[57] ABSTRACT

A garlic grater having a grating drum with a cylindrical grate driven into rotation by a motor which is preferably operated with batteries. The grating drum is freely mounted within an inner liner in such a manner as to define an annular, garlic skin-receiving chamber between the grate and the inner surface of the inner liner. A lateral opening is provided in the inner liner, through which a clove of garlic can be inserted and press against the grate. The grater also has a base for collecting the garlic juice and gathering up the garlic gratings falling from the grating drum when a clove of garlic is pressed against the drum while the same is rotating. This base has a cup-shaped member detachably mounted under the drum, a central support projecting upwardly from the cup-shaped member so as to extend axially within the cylindrical grate, and a wiper radially projecting from the central support so as to contact and wipe the cylindrical grate surface internally while the grating drum is rotating. Pressing of a clove of garlic onto the grate preferably with a handle causes the skin of the clove to be torn out by the teeth of the grate and to accumulate within the annular chamber surrounding the grate. Then, the peeled clove is grated while the juice and gratings formed inside the grate is collected with the wiper. Thus, no direct contact with the peeled clove is required to process this clove.

14 Claims, 2 Drawing Sheets

GARLIC GRATER

BACKGROUND OF THE INVENTION a) Field of the Invention

The present invention relates to a kitchen utensil, hereinafter called "garlic grater", that in particularly intended to be used to peel off and grate cloves of garlic or other similar products, such as small onions.

b) Brief Description of the the Prior Art

To obtain garlic juice and/or gratings for spicing or flavoring a food preparation or meal, it is of common practise to take cloves of garlic, to peel off the skin of the cloves with a knive, and then either to chop the peeled cloves with the knife or to grate it with a flat grate.

Garlic presses are also known, comprising a small container provided with a perforated bottom, in which a clove of garlic previously peeled off can be inserted and pressed with a handle. The clove that is so pressed is crushed and converted into juice and gratings while it passes through the perforations of the bottom of the casing.

In both cases, it is compulsory to peel off the cloves prior to processing them. It is also compulsory to use a knife or a scraper to collect the gratings that stick onto the bottom of the grate or the perforated bottom of the garlic press, because of their moisture content.

SUMMARY OF THE INVENTION

An object of the present invention is to provide a garlic grater of very simple yet efficient structure, which permits to process cloves of garlic to recover garlic juice and gratings without having to previously peel off the cloves.

An other object of the invention is to provide a garlic grater of the above type, in which the garlic juice and gratings that are produced, are collected with a wiper into a cup-shaped member, thereby making it possible to handle and process cloves of garlic without having to touch them with the fingers after they have been peeled off.

A further object of the invention is to provide a garlic grater of the above type, which is compact, motorized and preferably battery-energized.

In accordance with the invention, these object are achieved with a garlic grater comprising:

a) a body defining a cavity, this body having a bottom portion;

b) a motor mounted within the cavity of the body, this motor having a driving shaft projecting downwardly at the bottom portion of the body;

c) a grating drum comprising:
   a cylindrical grate having a punched-out surface defining a plurality of equally spaced-apart, outwardly projecting teeth, the grate also having a top edge and a bottom edge;
   a top cover comprising a top ring fixed to the top edge of the grate and a top wall provided with a central portion shaped to operatively engage the driving shaft of the motor; and
   a bottom ring fixed to the bottom edge of the grate;
   both rings having outer surfaces projecting radially outwardly at a distance from the surface of the grate;

d) a casing having a top portion detachably connected to the bottom portion of the body and a bottom portion, the casing including:
   a cylindrical inner liner sized and shaped to freely receive and hold the grating drum, the inner liner having an inner surface in sliding contact wich the lateral surfaces of the rings of the grating drum, the inner surface being thus spaced apart from the surface of the grate and defining therewith an annular, garlic skin-receiving chamber, the inner liner also having an open bottom end and a lateral opening which gives access to the grate and chamber, and through which a clove of garlic can thus be inserted and press against the grate; and e) a base for collecting the garlic juice and for gathering up the garlic gratings falling from the grating drum when a clove of garlic is pressed against the drum while the drum is driven into rotation by the motor, said base including:
   a cup-shaped member detachably connected to the bottom portion of the casing;
   a central support projecting upwardly from the cup-shaped member so as to extend within the cylindrical grate; and
   a wiper radially projecting from the central support so as to contact and wipe the cylindrical grate surface internally while the grating drum is rotating.

Preferably, the garlic grater according to the invention may also comprise:

f) a handle for pressing the clove of garlic to be grated against the grate through the lateral opening of time inner liner of the casing, the handle extending generally vertically outwardly and having a top end pivotably mounted onto the body above the lateral opening about an axis perpendicular to the driving shaft of the motor, the handle also having a bottom end which faces the lateral opening and is movable towards and away from the grate when the handle is pivoted about the axis.

Preferably also, the garlic grater according to the invention is devised so that:

the motor is electric;

the cavity defined by the body is big enough and shaped to receive at least one battery to operate the motor; and an outer switch is fixed to the body above the handle to electrically connect battery(ies) the motor to operate the same.

As can now be understood, pressing of a clove of garlic onto the grate preferably with the handle causes the skin of this clove to be torn out by the teeth of the grate and to accumulate within the annular chamber surrounding the grate. Then, the clove is grated while the juice and gratings formed inside the grate is collected by the wiper and can be provided by the same into a pan. Thus, direct hand-contact with the garlic juice or gratings can be avoided.

BRIEF DESCRIPTION OF THE DRAWINGS

The invention will be better understed upon reasing the following non restictive description of a preferred embodiment thereof, given with reference to the accompanying drawings in which.

DESCRIPTION OF A PREFERRED EMBODIMENT OF THE INVENTION

Figure 1:
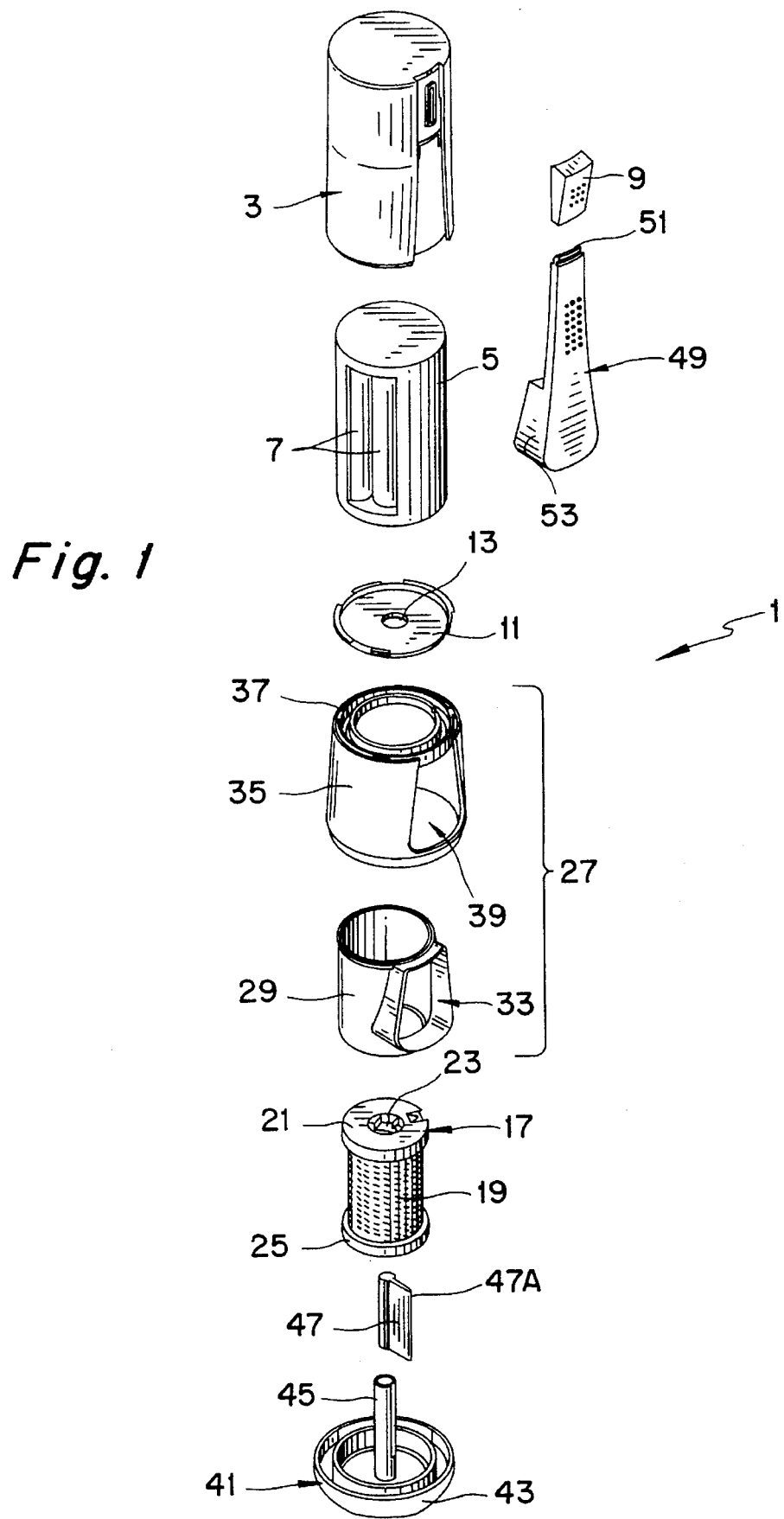
FIG. 1 is are exploded perspective view of a garlic grater according to the invention.

The garlic grater 1 according to the invention as shown in the accompagnying drawings is intended to be used to peel off and grate cloves of garlic or any other similar product provided with a "dry" skin. It is worth mentioning however that the grater 1 is not exclusively restricted to this particular use and could actually be used for grating other products such as cheese, cold chocolate, nuts and the like.

The grater 1 comprises a body 3 which is preferably cylindrical in shape. This body 3 defines a cavity which is sized and shaped to receive an electric motor 5 and a set of batteries 7 incorporated into one or more recesses provided in the casing of the motor 5. A outer push-in switch 9 is fixed to the body on top of its lateral side to electrically connect the batteries to the motor in order to operate the same.

Figure 2:
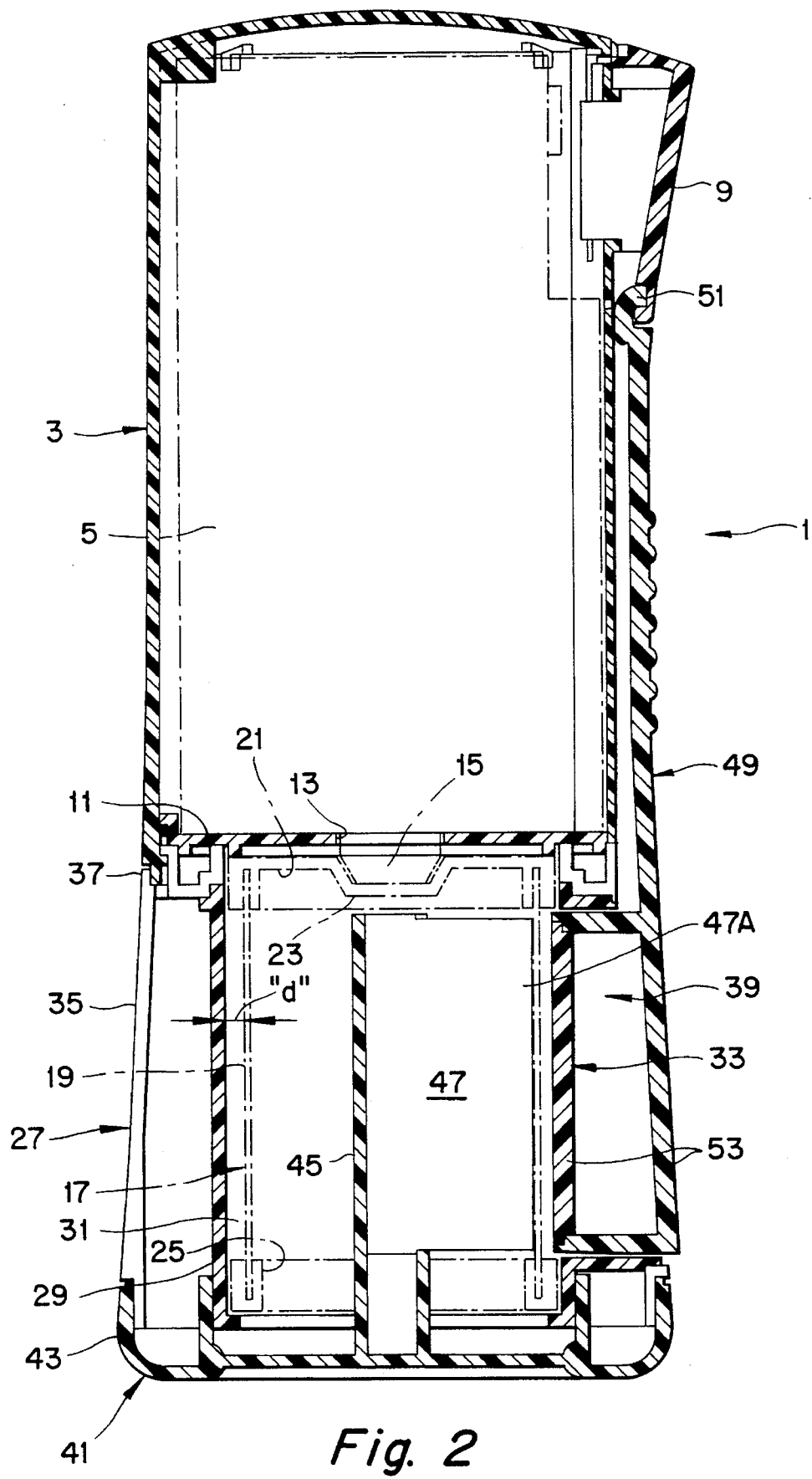
FIG. 2 is a side elevational, cross-section view of this garlic grater in assembled form.

As is better shown in FIG. 2, the motor 5 and batteries 7 are insertable into the cavity of the body 3 via an opening provided at the bottom of the same. After insertion, the motor and batteries can be locked into the cavity with a fastening ring 11 that can be screwed or otherwise detachably fixed to the bottom of the casing.

The fastening ring 11 has a central hole 13 which is sized to let pass the driving shaft 15 of the motor 5, so that this shaft may project downwardly at the bottom of the body 3.

The grater 1 also comprises a grating drum 17 including a cylindrical grate 19 made of metal. This grate has a punched-out surface defining a plurality of equally spaced-apart, outwardly projecting teeth. The grate 19 also has a top edge to which is fixed a top cover 21 comprising a top ring and a top wall provided with a central, recessed portion 23 shaped to operatively engage, thanks to a set of teeth, the driving shaft 15 of the motor 5. The grate 19 further has a bottom edge to which a bottom ring 25 is fixed. As can be seen, the top and bottom rings of the drum 17 are of the same diameter and have outer surfaces projecting radially outwardly at a short distance "d" from the external surface of the grate 19.

The grater 1 further comprises a casing 27 having a top portion detachably connectable to the bottom portion of the body 3. This casing is preferably made of two parts. One of these parts consists of a cylindrical inner liner 29 sized and shaped to freely receive and hold the grating drum 17. This inner liner has an inner surface in sliding contact with the lateral surfaces of the top and bottom rings of the grating drum 17 as is clearly shown in FIG. 2. Thus, the inner surface of the inner liner 29 is spaced apart from the surface of the grate 19 by a distance at least equal to "d", such a spacing defining an annular, garlic skin-receiving chamber 31. In practise, it has been found that the width of the chamber 31, which width substantially corresponds to the distance "d", must be long enough to receive and collect the skin but not too long to prevent part of the garlic cloves from moving in it and thus avoid being grated. For maximum efficiency, such width should be from 0.075 to 0.250 inch.

As is also shown, the inner liner 29 has an open bottom end and a lateral opening 37 which gives access to the grate 17 and chamber 31 and through which a clove of garlic can be inserted and pressed against the grate 17.

The other part of the casing 27 consists of an outer decorative liner 35 preferably of circular cross-section, surrounding the inner liner 29 which is mounted within the same. This outer liner has a top edge 37 detachably connected to the bottom portion of the body 3 by fixation means which are preferably of the bayonet-type. Of course, the outer liner must also have a lateral opening 39 facing the lateral opening 33 of the inner liner 29 to give access to the same and to the grate.

The grater 1 according to the invention further comprises a base 41 for collecting the garlic juice and for gathering up the garlic gratings falling from the grating drum 17 when a clove of garlic is pressed against the drum 19 while the drum is driven into rotation by the motor 5. As is shown, this base 41 includes a cup-shaped member 43 detachably connectable to the bottom edge of the outer liner 35 of the casing by fixation means of the bayonet-type or by any other similar fixation means that makes the elements easy to detach.

The base 41 also a central support or stem 45 projecting upwardly from the cup-shaped member 43 so as to extend preferably but not necessarily axially within the cylindrical grate. The stem 45 is longitudinally slotted to receive and hold a wiper 47 made of rubber or soft plastic material, which radially projects from the stem. The wiper 47 includes a straight edge 47A which a makes straight continuous line of contact with the internal cylindrical grate surface while the grating drum 17 is rotating.

A handle 49 is provided for pressing the clove of garlic to be grated against the grate through the lateral openings 33 and 39 of the inner and outer liners of the casing. This handle 49 extends generally vertically outwardly and has a top end 51 pivotably and detachably mounted onto the body above the lateral openings 33 and 39 about an axis perpendicular to the driving shaft 15 of the motor 5. The handle 49 also has a bottom end 53 which faces the lateral openings 33 and 30 and is movable towards and away from the grate 19 when the handle is pivoted about its axis. Preferably, the bottom end 53 of the handle 49 is shaped to enter into the lateral opening of the inner liner to press the clove of garlic to be grated against the grate.

As is shown, the lateral openings 37 and 39 of the casing and the bottom end 53 of the handle 49, are rectangular in shape. However, they could be of a different shape.

Instead of a pivotable handle 49, use could alternatively be made of a small hand-held "block" sized to enter into the lateral opening 33 and 39 of the casing 27, so as to normally push the cloves of garlic against the grate 19.

In practice, the body 3, the top cover and bottom ring of the drum 17, the casing 27, the cup-shaped member 43 and central stem 45 of the base 41, and the handle 49 can be molded from rigid plastic material.

Tests carried-out on a prototype have shown that such a grater is very efficient.

Of course, numerous modification could be made to the embodiment that has been disclosed hereinafter without departing from the scope of the invention as defined in the appended claims.

We claim:

1. A garlic grater, comprising:

a body defining a cavity;

a motor mounted within the cavity and including a drive shaft rotatable about a longitudinal axis;

a hollow grating drum mounted for rotation about the longitudinal axis and connected to the drive shaft to be driven thereby, the grating drum including a cylindrical wall having through-holes extending therethrough, the cylindrical wall including radially spaced outer and inner surfaces, the outer surface having cutting teeth, a portion of the grating drum disposed beneath the inside surface of the grating drum being open;

a stationary cylindrical liner encircling the wall of the grating drum and being spaced radially outwardly therefrom to define therewith an annular skin-receiving chamber, the liner including an open bottom and a lateral opening for providing access to the outer surface of the wall to enable garlic to be pressed against the outer wall;

a base disposed below the grating drum for collecting cuttings and juice falling from inside the grating drum, the base being detachable with respect to the drum; and a wiper disposed within the grating drum and bearing against the inner surface, the grating drum being rotatable relative to the wiper so that the wiper wipes the inner surface.

2. The garlic grater according to claim 1 wherein the wiper includes a straight edge forming a straight continuous line of contact with the inner surface.

3. The garlic grater according to claim 1 wherein the wiper is stationary and affixed to the base.

4. The garlic grater according to claim 3 wherein the base includes a support projecting within the grating drum, the wiper affixed to the support and projecting radially outwardly therefrom.

5. The garlic grater according to claim 1 further including first and second rings affixed to opposite axial ends of the grating drum, both rings extending radially outside of the outer surface and engaging the liner in sliding contact therewith.

6. The garlic grater according to claim 1 wherein the grater rests on the base so that the longitudinal axis is vertical, the motor being disposed above the grating drum; a handle provided for pressing garlic against the outer surface, the handle having a top end mounted to the body for rotation about a horizontal pivot axis, and a bottom end movable toward and away from the lateral opening of the liner.

7. The garlic grater according to claim 6 wherein the bottom end of the handle is sized to pass through the lateral opening.

8. The garlic grater according to claim 7 wherein the bottom end and the lateral opening are both of rectangular shape.

9. The garlic grater according to claim 1 wherein the liner constitutes an inner liner, there being an outer liner extending around the inner liner and attached to the body, the base being detachably connected to the outer liner, the outer liner having a lateral opening aligned with the lateral opening of the inner liner.

10. The garlic grater according to claim 9 wherein the body, outer liner and base are of circular cross section, the outer liner being attached to the body and base by respective bayonet couplings.

11. The garlic grater according to claim 1 wherein the cavity includes a battery compartment for receiving a battery.

12. The garlic grater according to claim 1 wherein the wall of the grating drum is formed of metal and is punched out to form the teeth and through-holes.

13. The garlic grater according to claim 12 wherein the wiper is formed of rubber.

14. The garlic grater according to claim 13 wherein the body and base are formed of a rigid plastic material.

* * * * *